May 1, 1951     H. R. POETKER     2,551,286
DERRICK
Filed May 19, 1947
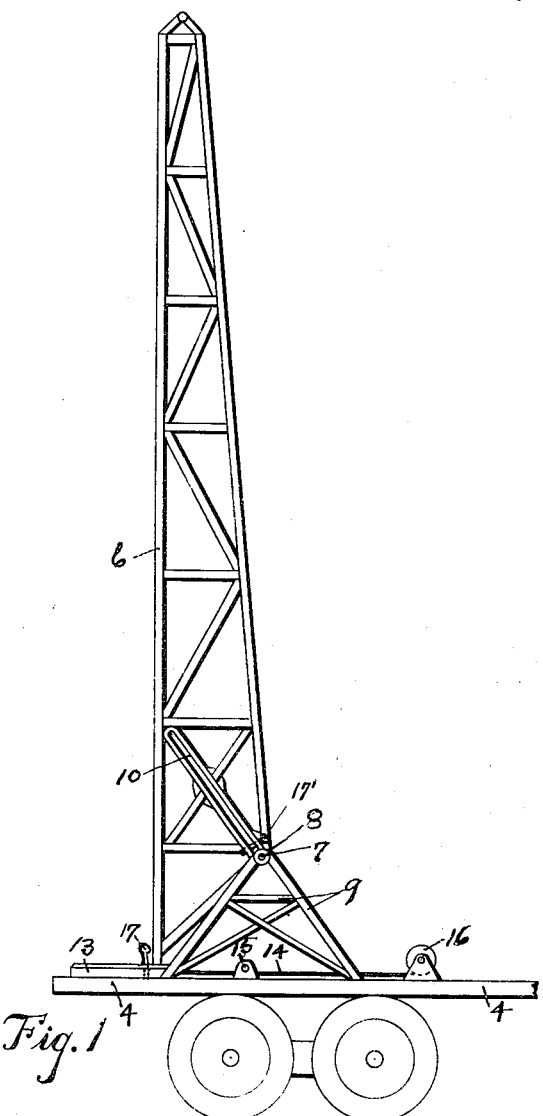
Fig.1
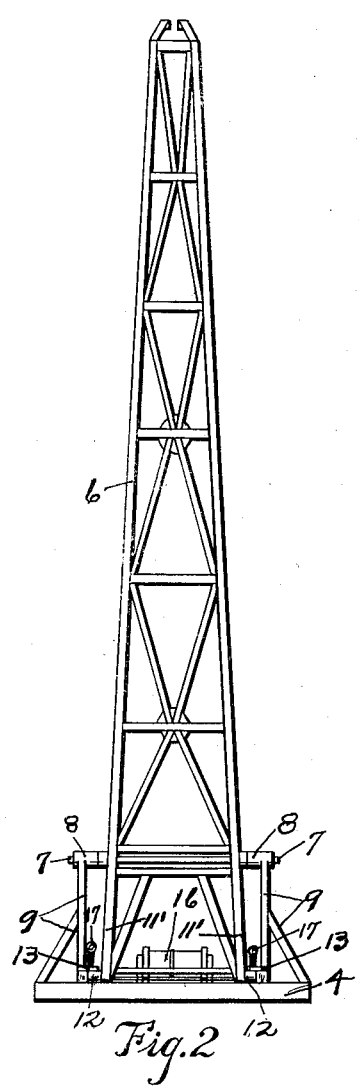
Fig.2
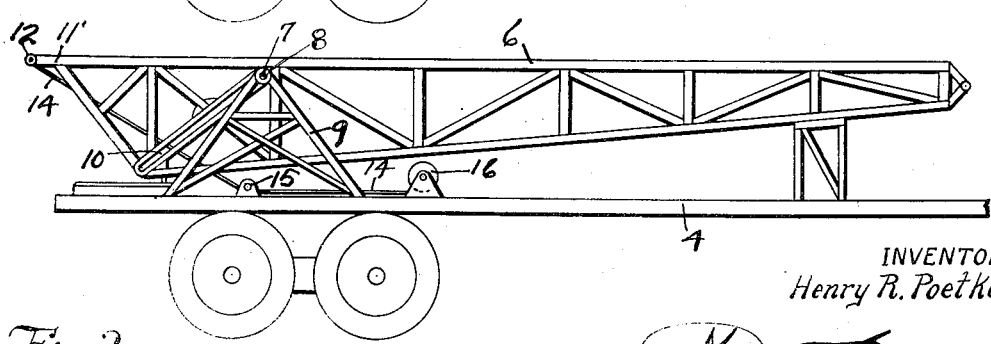
Fig.3
INVENTOR,
Henry R. Poetker
ATTORNEY.

Patented May 1, 1951

2,551,286

UNITED STATES PATENT OFFICE 2,551,286

DERRICK

Henry R. Poetker, Sanger, Calif.

Application May 19, 1947, Serial No. 749,039

3 Claims. (Cl. 189—11)

This invention relates to derricks, and more particularly to portable derricks which can be raised and lowered on a pivotal mounting, whereby the derrick can be raised from a horizontal, or transporting position, to a vertical, or operating position, thus making it possible to quickly move and adjust the derrick, and saving a great deal of time and labor in "rigging-up" and "tearing down."

The principal object of my invention is to provide a derrick of the character referred to having a new structural feature which greatly simplifies the work of raising and lowering the derrick.

I am aware that derricks have been used which can be raised and lowered, but I believe I have a simple mechanical feature which makes for real improvement.

In order to explain my invention, I have shown on the accompanying sheet of drawings one practical embodiment thereof, in which:

Figure 1 is a side elevation of a derrick embodying my invention, mounted on a carrier for transportation, with the derrick in its raised or operating position;

Figure 2 is a front elevation of the same; and

Figure 3 is a side elevation of the derrick lowered into its down position for transportation.

Referring in detail to the drawings, the derrick is preferably mounted upon a base or platform 4, of a trunk or trailer of any suitable type for moving it from place to place.

The derrick proper, designated 6, may be of any suitable and desired body construction, pivotally supported on an A-frame structure on the platform 4, with a pivot shaft 7, mounted in suitable bearings 8, 8, in the top of the A-frame, designated 9. This supporting structure can be of any suitable type and arrangement.

In the body of the derrick, is a pair of inclined or angular slideways, as 10, 10, in which the pivot shaft 7 moves as the derrick is raised and lowered, with a lock pin as 17' to be inserted therein when the derrick is in its raised position, as seen in Fig. 1.

The derrick body has at its lower end a toe-like extension 11', 11', having two sides, and on the ends of these extensions are two guide rollers 12, 12, adapted to enter and move in two horizontal guide-ways 13, 13, as said derrick is pulled from the down position shown in Fig. 3, to the raised position shown in Figs. 1 and 2.

As one means for moving said derrick body on its pivot shaft from the horizontal position, Fig. 3, to the position shown in Figs. 1 and 2, cables 14, 14, are attached to the toe-like extensions 11' and extended thence under a roller or rollers, as at 15, to the power plant, which can be a winch or windlass, as indicated, or any other suitable power.

As a means for holding said derrick in its vertical, or operating position, when it has been thus pulled up, I have indicated two pins or bolts, as 17, 17, which can be inserted down through the guide-ways 13, 13. Of course any other means can be provided for locking the derrick in its raised position.

I submit that the main feature of the invention is the mounting with the angular slide-ways, 10, 10, and the pivot shaft 7, on which said derrick is pivotally supported, whereby, as said derrick is pulled up from the horizontal position to the vertical position it pivots on said shaft until the toe-like extensions 11', 11' and the rollers 12, 12, enter the horizontal guide-ways, whereupon the continued movement of the derrick to its raised position moves said angular slide-ways 10, 10, to move upwardly over said pivot shaft until said pivot shaft rests in the bottom of said slideways, as in Fig. 1, when the holding pins 17, 17 are put in place to hold the derrick in its raised position.

I am aware that changes in the details of construction and arrangement can be made in the showing here presented for explanatory purposes, without departing from the spirit of the invention, and I do not, therefore, limit the invention to the showing made, except as I may be limited by the hereto appended claims.

I claim:

1. In a derrick, a derrick body, a support therefor, a fixed pivot member on said support, said derrick body having an angular slideway therein to move lengthwise on said pivot member, whereby said pivot member is positioned in the upper side of said derrick when said derrick is moved down to recumbent position, and said slideway is inclined downwardly toward the base of said derrick, said derrick having at its lower end an extension on one side with anti-friction means at its end, said extension and said anti-friction means being positioned on the upper side of said derrick when said derrick is in a recumbent position, a horizontal guide-way on said support to receive the end of said extension, power means on said support, and connections from said power means to said extension for pulling it from a horizontal position to a vertical position, and simultaneously moving said slideway upwardly on said pivot member.

2. In a derrick, a vertical derrick body, a support therefor, a fixed pivot shaft on said support, said derrick body have a pair of angular slide-ways therein, at its opposite sides, to move lengthwise on said pivot shaft, whereby said pivot shaft is positioned in the upper side of said derrick when said derrick is moved down to a recumbent position and said slide-ways are inclined downwardly toward the base of said derrick, said derrick body having at its lower end an extension on one side with anti-friction means at its end, said extension and said anti-friction means being positioned on the upper side of said derrick when said derrick is in a recumbent position, a pair of horizontal guide-ways on said support, open at one end to receive said anti-friction means, power means on said support, and connections from said power means to said extension for pulling it from a horizontal position to a vertical position, with said anti-friction means moving in said horizontal guide-ways and said angular slide-ways simultaneously moving up on said pivot shaft.

3. In a derrick of the character referred to a vertical derrick body, a carrier support therefor, an A-frame on said support, a fixed pivot shaft on said A-frame, a pair of angular slide-ways in said derrick body to pivot on and to move lengthwise on said pivot shaft, whereby said pivot shaft is positioned in the upper side of said derrick when said derrick is moved down to a recumbent position and said slide-ways are inclined downwardly toward the base of said derrick, said derrick body having one side extended at its lower end to form a toe-like extension at one side, rollers on the end of said extension, said extension and said rollers being positioned on the upper side of said derrick when said derrick is in a recumbent position, a pair of horizontal guide-ways on said support, open at one end to receive the rollers on said extension when said extension is pulled down, power means on said support, and connections from said power means to said toe-like extension for pulling it down to put said rollers in said guide-ways, and to simultaneously move said angular slide-ways upwardly on said pivot shaft, whereby to pull said toe-like extension downwardly and into said horizontal guide-ways, and means for holding said derrick body in its vertical operating position.

HENRY R. POETKER.

REFERENCES CITED

The following references are of record in the file of this patent:

UNITED STATES PATENTS

| Number | Name | Date |
|---|---|---|
| 301,308 | Walker | July 1, 1884 |
| 986,352 | Briggs | Mar. 7, 1911 |
| 2,300,763 | Athy | Nov. 3, 1942 |
| 2,344,390 | Cohen | Mar. 14, 1944 |